United States Patent

Codina et al.

[11] Patent Number: 5,497,804
[45] Date of Patent: Mar. 12, 1996

[54] INTEGRAL POSITION SENSING APPARATUS FOR A HYDRAULIC DIRECTIONAL VALVE

[75] Inventors: George Codina, North Hollywood, Calif.; Eldon D. Oestmann, Morton; Gary J. Shane, Edelstein, both of Ill.

[73] Assignee: Caterpillar Inc., Peoria, Ill.

[21] Appl. No.: 266,060

[22] Filed: Jun. 27, 1994

[51] Int. Cl.$^6$ .................................................. F16K 37/00
[52] U.S. Cl. ..................... 137/554; 137/625.69; 336/20; 324/207.15
[58] Field of Search .............................. 137/554, 625.69; 336/20; 324/207

[56] References Cited

U.S. PATENT DOCUMENTS

| | | | |
|---|---|---|---|
| 2,448,296 | 8/1948 | Cary, Jr. | 336/20 |
| 2,563,413 | 8/1951 | Ostrow | 336/20 |
| 3,302,108 | 1/1967 | Murphy | 324/176 |
| 3,654,549 | 4/1972 | Maurer et al. | 324/207.16 |
| 4,085,394 | 4/1978 | Weisenburger | 336/20 |
| 4,226,126 | 10/1980 | Herden | 336/20 X |
| 4,631,478 | 12/1986 | Knetsch et al. | 324/207 |
| 4,825,184 | 4/1989 | Bloch et al. | 336/20 |
| 4,879,511 | 11/1989 | Leon | 137/554 X |
| 4,953,590 | 9/1990 | Kakinuma et al. | 137/554 |
| 5,101,856 | 4/1992 | Kakinuma et al. | 137/554 |
| 5,118,071 | 6/1992 | Huelle | 137/554 X |
| 5,233,293 | 8/1993 | Huang et al. | 324/207.15 |

OTHER PUBLICATIONS

Patent Appln. No. 08/197,624, filed Feb. 16, 1994, "Position Sensor for a Hydraulic Cylinder", George (NMI) Codina, et al., Docket No. 93-447.

*Primary Examiner*—John Rivell
*Attorney, Agent, or Firm*—David M. Masterson

[57] ABSTRACT

An apparatus for determining the spool position of a directional valve is disclosed. A longitudinal valve housing has opposed ends and a plurality of fluid ports, and a spool moves reciprocatingly within the valve housing. A first spring disposed adjacent an end of the spool extends and retracts with the reciprocating movement of the spool. A first oscillator circuit is coupled to the first spring and is adapted to produce a first position signal in response to the inductance of the first spring. Finally, a logic device determines the incremental linear position of the spool relative to the housing in response to the frequency of the first position signal.

9 Claims, 3 Drawing Sheets

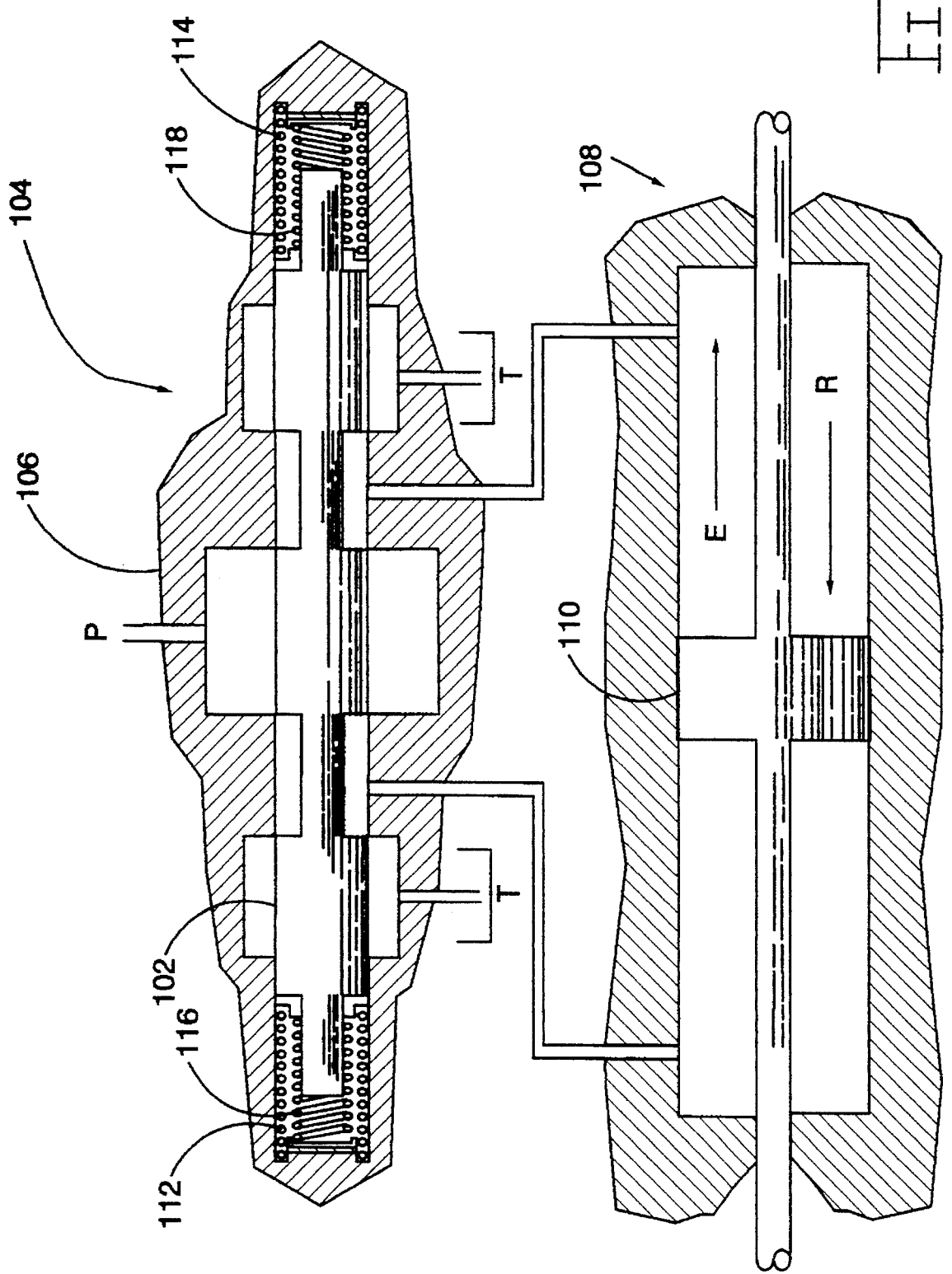

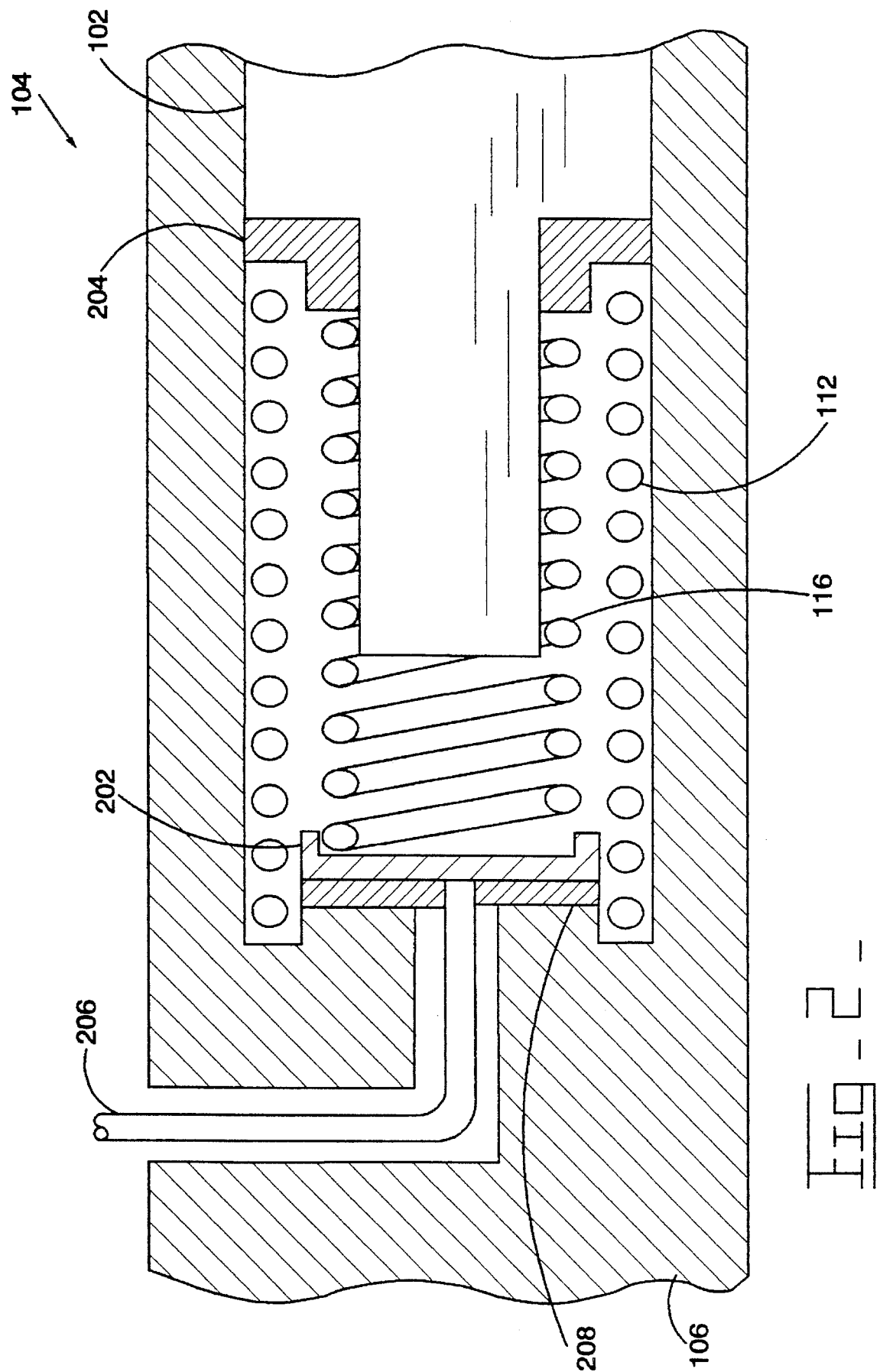

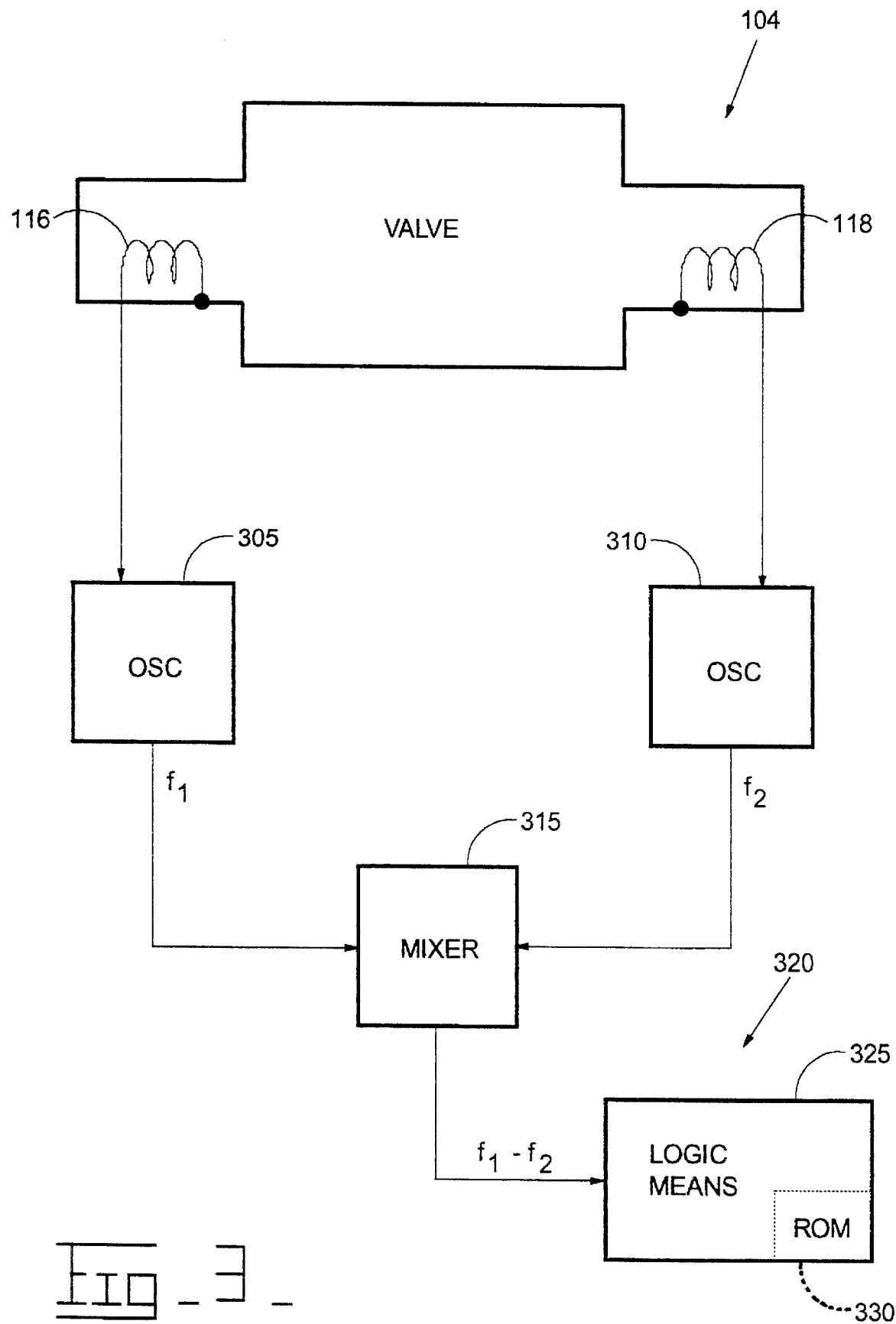
Fig_3_

5,497,804

INTEGRAL POSITION SENSING APPARATUS FOR A HYDRAULIC DIRECTIONAL VALVE

TECHNICAL FIELD

This invention relates generally to an integral position sensing apparatus for a hydraulic directional valve and, more particularly, to an integral position sensing apparatus for a hydraulic directional valve that uses inductive sensing techniques.

BACKGROUND ART

In the field of hydraulics, it is desirable to determine the position of a spool within a directional valve. For example, information pertaining to the position of the spool may be used for closed-loop control of the directional valve providing for improved system performance.

The most common method of determining spool position is the use of such sensors as potentiometers or linear voltage differential transformers (LVDTs). While these sensors provide the desired information, such sensors have serious deficiencies owing in part to difficulties in mounting the units and the harsh environmental conditions to which they are exposed.

Sensors used on hydraulic systems in the heavy equipment industry are particularly subject to damage from the severe work environment. Hydraulic directional valves are typically located in relatively unprotected areas and subjected to, for example, high g-forces, wide temperature variations, dust, water, debris, etc., which can result in both electrical and mechanical failure of the sensor.

The present invention is directed to overcoming one or more of the problems as set forth above.

DISCLOSURE OF THE INVENTION

In one aspect of the present invention, an apparatus for determining the spool position of a directional valve is disclosed. A longitudinal valve housing has opposed ends and a plurality of fluid ports, and a spool moves reciprocatingly within the valve housing. A first spring disposed adjacent an end of the spool extends and retracts with the reciprocating movement of the spool. A first oscillator circuit is coupled to the first spring and is adapted to produce a first position signal in response to the inductance of the first spring. Finally, a logic device determines the incremental linear position of the spool relative to the housing in response to the frequency of the first position signal.

BRIEF DESCRIPTION OF THE DRAWINGS

For a better understanding of the present invention, reference may be made to the accompanying drawings in which:

FIG. 1 shows a cross sectional view of a hydraulic system incorporating a directional valve;

FIG. 2 shows cross section view of a portion of the directional valve; and

FIG. 3 a block diagram of an embodiment of the electrical circuitry associated with the present invention.

BEST MODE FOR CARRYING OUT THE INVENTION

The present invention is adapted to determine the position and velocity of a spool 102 of a hydraulic directional valve 104, as shown in FIG. 1. The spool 102 has reciprocating movement within the valve housing 106. The directional valve 104 meters hydraulic fluid to a hydraulic cylinder 108. For example, the spool is moveable within a range of three flow positions for precisely controlling the flow of hydraulic fluid to the hydraulic cylinder 108. Note that, although a closed-center directional valve is shown, the present invention is equally suited towards open-center, pressure compensation, non-pressure compensated or the like kind of directional valves.

In the first flow position, hydraulic fluid under pressure (generally denoted as P) from a pump (not shown) passes through the directional valve to the hydraulic cylinder. The hydraulic fluid, which flows to one end of the hydraulic cylinder, exerts a force on one end of the piston 110 in the direction of the arrow labelled E. Hydraulic fluid from the other end of the hydraulic cylinder passes through the directional valve and back to a tank of the hydraulic fluid, T.

In the second or neutral flow position, the spool is held at its current position by the use of centering springs. For example, a pair of main centering springs 112,114 are disposed on opposed sides of the housing 106 and adjacent to the ends of the spool 102. Moreover, a pair of subordinate centering springs 116,118 are disposed within the set of main centering springs 112,114 to assist the main centering springs 116 in biasing the spool 102 to its neutral position. Although two sets of centering springs are shown, one set of centering springs may be sufficient, as the present invention is not limited the specific spring assembly shown.

In the third flow position, hydraulic fluid passes through the directional valve to the other end of the hydraulic cylinder and exerts a force on the other end of the piston, thereby retracting the piston in the direction of the arrow labelled R. Hydraulic fluid from the one end of the hydraulic cylinder returns through the directional valve to the tank, T.

Note that, although the directional valve is shown metering fluid to a hydraulic cylinder, depending on the particular application, a symmetrical or a rotary motor may be substituted for the hydraulic cylinder.

Referring now to FIG. 2, a cross sectional view of one end of the directional valve 104 is shown. Although one end of the directional valve is described, it is noted that the other end is similarly constructed. One of the subordinate centering springs 116 is disposed between two electrically conducing washers 202,204. Preferably, the pair of subordinate centering springs 116,118 are coated with a non-conductive material that electrically insulates the springs. However, the ends of the subordinate centering springs 116,118 are not coated to become electrically conductive with the washers 202,204.

An electrical connection from an external source is provided via an insulated conductor 206 to the subordinate centering spring 116. An insulating washer 206 is disposed between the electrically conducing washer 202 to isolate the electrical connection from the valve housing 106.

As the spool 102 moves linearly within the housing 106 the subordinate centering springs 116,118 extend and retract with the reciprocating movement of the spool. Thus, the dimensions of the springs, i.e., the number of turns per unit length changes as the spool moves. Advantageously, the present invention utilizes the subordinate centering springs 116,118 as variable inductors in a resonant circuit to determine the linear position of the spool 102. The external circuitry associated with the present invention is shown with reference to FIG. 3.

A power supply (not shown) delivers electrical energy to the circuit components. The power supply may deliver voltages from 5 to 15 volts.

Each subordinate centering spring 116,118 is connected to a standard LC-type oscillator 305,310 that produces a sinusoidal waveform. A suitable oscillator may include a Colpitts oscillator, which is well known in the art. In response to the inductance of each spring 116,118, the oscillators 305,310 produce first and second position signals having a variable frequency. Because the position signals are representative of the inductance of the individual springs, the position signals are additionally representative of the spring length. The length of the springs are responsive to the spool position. Consequently, the position signals are also representative of the spool position.

To compensate for temperature and to provide for greater resolution, a mixer 315 is added to the circuit. The mixer 315 receives the position signals and produces a mixed signal having a frequency value equal to the difference between the position signals. The frequency value of the mixed signal gives an accurate representation of the linear position of the spool 102 relative to the housing 106.

For example, while the spool 102 moves from the second flow position to the third flow position, the second subordinate centering spring 118 becomes compressed by the spool 102. Thus, the second position signal represents the inductance due to compression. However, because the first subordinate centering spring 116 is at rest, the first position signal is used as a reference value that may include such characteristics as ambient temperature. Consequently, the mixed signal yields information regarding spool position while also compensating for temperature effects.

A logic means 320 receives and determines the frequency of the mixed signal. In response to the mixed signal frequency, the logic means determines the incremental linear position of the spool 102 relative to the housing 106. Once the positional information is determined, the logic means numerically differentiates the mixed signal and determines the velocity of the spool relative to the housing.

Preferably the logic means 320 is a microprocessor 325 that includes ROM 330 which stores empirically determined data that relates a plurality of frequencies to a plurality of spool positions and velocities. For example, the microprocessor receives the mixed signal and retrieves the stored characteristics from the ROM and compares the characteristics to the representative signal to determine the position of the spool relative to the housing. A two-dimensional look-up table of a type well-known in the art may be used to complete the comparison and select the value.

The circuitry shown in FIG. 3 is exemplary, and the manner of design and construction of this, or a similar, circuit would be commonly known to a person skilled in the art.

Thus, while the present invention has been particularly shown and described with reference to the preferred embodiment above, it will be understood by those skilled in the art that various additional embodiments may be contemplated without departing from the spirit and scope of the present invention.

INDUSTRIAL APPLICABILITY

In the overall operation of the present invention, assume that the directional valve 104 meters hydraulic fluid to the hydraulic cylinder 108 that is connected to a work implement of a construction machine, such as the blade of a bulldozer, for example. A control system seeks to maintain the height of the bulldozer blade at an optimum position to maximize the work performed by the bulldozer. The use of modern control theory allows the control to monitor various operating parameters and apply a properly weighted PID equation to continuously adjust the height of the blade and effect optimal control. Proper feedback of the height of the blade is necessary to govern the blade position in a stable manner. The position feedback must necessarily be of a relatively high accuracy and is provided by the present invention.

Operation of the present invention is based upon the similarities exhibited between the amount of extension/retraction of the centering springs 116,118 and the inductance thereof. Because the spring inductance is part of an LC-type oscillator, the frequency of the signal produced by the oscillator is proportional to the inductance of the spring. From this principle by determining the frequency of the position signal, the position of the spool can be derived; hence, the position of the work implement is directly proportional to the position signal frequency.

Known linear position sensors suffer from inaccuracies owing to severe environmental conditions, such as shock, temperature and humidity. Physical damage to sensors exposed to rugged work conditions is a limiting factor in the expected life of the sensors that are used in the heavy equipment industry. The present invention is particularly suited for use in the heavy equipment industry for detecting the spool position of directional spool valves as the present invention is integral with the directional valve. Consequently, the present invention is protected from the work environment. The present invention is adapted to be retrofitted in existing directional valves with little customization and/or retooling.

Other aspects, objects and advantages of the present invention can be obtained from a study of the drawings, the disclosure and the appended claims.

We claim:

1. An apparatus for determining the spool position of a directional valve, comprising:

a longitudinal valve housing having opposed ends and a plurality of fluid ports;

a spool having reciprocating movement within the valve housing;

a first spring disposed adjacent an end of the spool, the first spring extending and retracting with the reciprocating movement of the spool;

a first oscillator circuit coupled to the first spring and adapted to produce a first position signal in response to the inductance of the first spring; and logic means for determining the incremental linear position of the spool relative to the housing in response to the frequency of the first position signal.

2. An apparatus, as set forth in claim 1, including a second spring disposed adjacent the other end of the spool, the second spring extending and retracting with the reciprocating movement of the spool.

3. An apparatus, as set forth in claim 2, including a second oscillator circuit coupled to the second centering spring, the second oscillator circuit producing a second position signal in response to the inductance of the second spring.

4. An apparatus, as set forth in claim 3, including a mixer for receiving the first and second position signals and producing a mixed signal having a frequency responsive to the difference in frequency between the first and second signals.

5. An apparatus, as set forth in claim 4, including a memory means for storing a plurality of spool positions corresponding to a plurality of frequency values.

6. An apparatus, as set forth in claim 5, wherein the logic means receives the mixed signal and selects one of the plurality of stored positions in response to the frequency of the mixed signal.

7. An apparatus, as set forth in claim 6, wherein the logic means receives the mixed signal, differentiates the mixed signal, and determines the velocity of the spool relative to the housing in response to the frequency of the differentiated mixed signal.

8. An apparatus, as set forth in claim 7, wherein the first and second springs includes:

a pair of subordinate centering springs; and a pair of main centering springs disposed about the subordinate centering spring pair, the subordinate and main centering springs adapted to bias the spool to a neutral position.

9. An apparatus, as set forth in claim 8, including a hydraulic cylinder having a piston, the spool being moveable within a range of three flow positions to deliver pressurized fluid to the hydraulic cylinder causing movement of the piston.

* * * * *